(12) United States Patent
Etemad et al.

(10) Patent No.: US 9,144,085 B2
(45) Date of Patent: Sep. 22, 2015

(54) MULTICAST/BROADCAST SERVICE CONTINUITY IN MULTI-CARRIER NETWORKS

(75) Inventors: Kamran Etemad, Potomac, MD (US); Yujian Zhang, Beijing (CN)

(73) Assignee: Intel Corporation, Santa Clara, CA (US)

( * ) Notice: Subject to any disclaimer, the term of this patent is extended or adjusted under 35 U.S.C. 154(b) by 565 days.

(21) Appl. No.: 13/531,848

(22) Filed: Jun. 25, 2012

(65) Prior Publication Data

US 2013/0083715 A1 Apr. 4, 2013

Related U.S. Application Data

(60) Provisional application No. 61/542,086, filed on Sep. 30, 2011.

(51) Int. Cl.
| | |
|---|---|
| *H04W 4/06* | (2009.01) |
| *H04W 72/12* | (2009.01) |
| *H04B 7/04* | (2006.01) |
| *H04W 52/02* | (2009.01) |
| *H04L 12/891* | (2013.01) |

(Continued)

(52) U.S. Cl.
CPC .......... *H04W 72/1215* (2013.01); *H04B 7/0456* (2013.01); *H04B 7/0619* (2013.01); *H04L 5/0032* (2013.01); *H04L 5/0037* (2013.01); *H04L 47/41* (2013.01); *H04W 4/06* (2013.01); *H04W 4/08* (2013.01); *H04W 28/042* (2013.01); *H04W 36/0005* (2013.01); *H04W 52/0235* (2013.01); *H04W 52/04* (2013.01); *H04W 72/005* (2013.01); *H04W 72/042* (2013.01); *H04W 76/048* (2013.01); *H04L 12/189* (2013.01); *Y02B 60/50* (2013.01)

(58) Field of Classification Search
None
See application file for complete search history.

(56) References Cited

U.S. PATENT DOCUMENTS 7,437,178 B2 10/2008 Jeong et al.
8,068,843 B2 11/2011 Yi et al.
(Continued)

FOREIGN PATENT DOCUMENTS

CN 101296028 A 10/2008
EP 2051408 A1 4/2009
(Continued)

OTHER PUBLICATIONS

3GPP TSG-RAN WG2 Meeting #75, R2-114282, Aug. 22-26, 2011, Athens, Greece.*
(Continued)

*Primary Examiner* — Alex Skripnikov
(74) *Attorney, Agent, or Firm* — Schwabe, Williamson & Wyatt, P.C.

(57) ABSTRACT

Embodiments of the present disclosure describe devices, methods, computer-readable media and systems configurations for management and/or support of multimedia broadcast multicast service (MBMS) service in a wireless communications network. An evolved Node B (eNB) may transmit MBMS assistance information to a user equipment (UE). The MBMS assistance information may identify a carrier by which one or more upcoming MBMS services are to be provided and an indicator of a carrier selection mode to be used by the UE. The UE may transmit an MBMS interest indication message including information related to one or more targeted MBMS services which the UE wants to receive.

23 Claims, 6 Drawing Sheets

(51) Int. Cl.

| | | |
|---|---|---|
| *H04W 52/04* | (2009.01) | |
| *H04B 7/06* | (2006.01) | |
| *H04L 5/00* | (2006.01) | |
| *H04W 72/04* | (2009.01) | |
| *H04W 4/08* | (2009.01) | |
| *H04W 36/00* | (2009.01) | |
| *H04W 28/04* | (2009.01) | |
| *H04W 72/00* | (2009.01) | |
| *H04W 76/04* | (2009.01) | |
| *H04L 12/18* | (2006.01) | |

(56) References Cited

U.S. PATENT DOCUMENTS

| | | | |
|---|---|---|---|
| 8,553,645 B2* | 10/2013 | Kuchibhotla et al. | 370/331 |
| 2009/0010196 A1 | 1/2009 | Bui et al. | |
| 2010/0246497 A1 | 9/2010 | Kim et al. | |
| 2010/0284319 A1 | 11/2010 | Wang et al. | |
| 2011/0070905 A1 | 3/2011 | Kazmi et al. | |
| 2011/0103288 A1 | 5/2011 | Lee et al. | |
| 2011/0305183 A1* | 12/2011 | Hsu et al. | 370/312 |
| 2013/0039250 A1* | 2/2013 | Hsu | 370/312 |

FOREIGN PATENT DOCUMENTS

| | | |
|---|---|---|
| EP | 2276275 A1 | 1/2011 |
| EP | 2302969 A1 | 3/2011 |
| JP | 2010531563 A | 9/2010 |
| JP | 2011055445 A | 3/2011 |
| JP | 2011509549 A | 3/2011 |
| JP | 2011139495 A | 7/2011 |
| KR | 20090033313 A | 4/2009 |
| KR | 10-2010-0017470 | 2/2010 |
| WO | WO2009/076210 A1 | 6/2009 |
| WO | 2010018658 A1 | 2/2010 |

OTHER PUBLICATIONS

3GPP TSG-RAN WG2 Meeting #75, R2-114417, Aug. 22-26, 2011, Athens, Greece.*
3GPP TSG-RAN WG2 #74, R2-113338, May 9-13, 2011, Barcelona, Spain.*
3GPP TSG-RAN WG2 #74, R2-113064, May 9-13, 2011, Barcelona, Spain.*
Notification Concerning Transmittal of International Preliminary Report on Patentability mailed Apr. 10, 2014 from International Application No. PCT/US2012/057483.
International Search Report and Written Opinion mailed Mar. 11, 2013 from International Application No. PCT/US2012/057483.
Office Action issued in European Divisional Patent Application No. 14186919.8, mailed on Jan. 16, 2015.
Office Action issued Feb. 10, 2015 from Japanese Application No. 2014-533711.
Office Action issued Feb. 19, 2015 from Australian Patent Application No. 2012316021.
Office Action issued Mar. 12, 2015 from MX Patent Application No. MX/a/2014/003737.
LG Electronics Inc., "Priority Handling for MBMS Service Continuity", 3GPP TSG-RAN WG2 #74, R2-113337, May 9-13, 2011, Barcelona, Spain.
CATT, "MBMS Continuity and the Relationship with CSG", 3GPP TSG RAN WG2 Meeting #75, RS-113945, Aug. 22-26, 2011, Athens, Greece.
Alcatel-Lucent Shanghai Bell et al, "Issues of MBMS service provision under CA", 3GPP TSG-RAN WG2 Meeting #73bis, RS-112229, Apr. 11-15, 2011, Shanghai, CN.
Alcatel-Lucent, "Congestion control on unicast traffic while receiving MBMS", 3GPP TSG-RAN WG2 Meeting #75, R2-114282, Aug. 22-26, 2011, Athens, Greece.
Huawei, HiSilicon, "Service continuity for connected mode UEs", 3GPP TSG-RAN WG2 Meeting #75, R2-114417, Aug. 22-26, 2011, Athens, Greece.
LG Electronics Inc., "Handover for MBMS service continuity", 3GPP TSG-RAN WG2 #74, RS-113338, May 9-13, 2011, Barcelona, Spain.
Qualcomm Incorporated, "Service Continuity and UE Capability," 3GPP TSG-RAN WG2 #74, RS-113064, May 9-13, 2011, Barcelona, Spain.
Nokia Siemens Networks, "MBMS Service Continuity and the UEs in RRC Connected," 3GPP TSG-RAN WG2 #75, R2-114450, Aug. 22-26, 2011, Athens, Greece.
Office Action issued Jun. 4, 2015 from Australian Divisional Application No. 2014227523.
Extended European Search Report issued Jun. 1, 2015 from European Divisional Application No. 14186919.8.
Office Action issued May 27, 2015 from Korean Patent Application No. 10-2014-7008409.
Office Action issued May 18, 2015 from Russian Patent Application No. 2014112051.

* cited by examiner

MULTICAST/BROADCAST SERVICE CONTINUITY IN MULTI-CARRIER NETWORKS

CROSS REFERENCE TO RELATED APPLICATIONS

The present application claims priority to U.S. Provisional Patent Application No. 61/542,086, filed Sep. 30, 2011, entitled "ADVANCED WIRELESS COMMUNICATION SYSTEMS AND TECHNIQUES," the entire disclosure of which is hereby incorporated by reference.

FIELD

Embodiments of the present invention relate generally to the field of communications, and more particularly, to multicast/broadcast service continuity in wireless communication networks.

BACKGROUND

Some wireless communications networks employ multimedia broadcast multicast service (MBMS) to broadcast media and/or other transmissions to a plurality of user equipment (UE). In some cases MBMS may be offered only on some carriers in multi-carrier networks. Maintaining service continuity for the UE in such networks can be challenging.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

DETAILED DESCRIPTION

Illustrative embodiments of the present disclosure include, but are not limited to, methods, systems, computer-readable media, and apparatuses for multimedia broadcast multicast service (MBMS) service continuity in a wireless communication network.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in some embodiments" is used repeatedly. The phrase generally does not refer to the same embodiments; however, it may. The terms "comprising," "having," and "including" are synonymous, unless the context dictates otherwise. The phrase "A and/or B" means (A), (B), or (A and B). The phrase "A/B" means (A), (B), or (A and B), similar to the phrase "A and/or B". The phrase "at least one of A, B and C" means (A), (B), (C), (A and B), (A and C), (B and C) or (A, B and C). The phrase "(A) B" means (B) or (A and B), that is, A is optional.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present disclosure. This application is intended to cover any adaptations or variations of the embodiments discussed herein. Therefore, it is manifestly intended that the embodiments of the present disclosure be limited only by the claims and the equivalents thereof.

As used herein, the term "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality.

Figure 1:
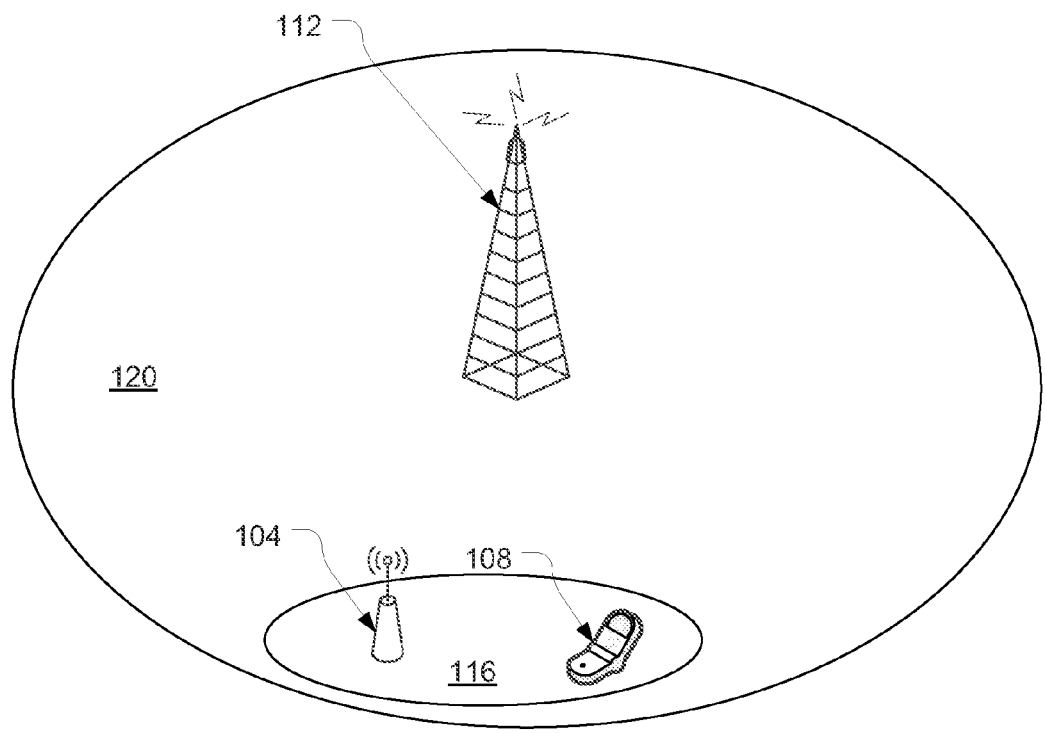
FIG. 1 schematically illustrates a wireless communication network in accordance with various embodiments.

FIG. 1 schematically illustrates a wireless communication network 100 in accordance with various embodiments. Wireless communication network 100 (hereinafter "network 100") may be an access network of a 3rd Generation Partnership Project (3GPP) long-term evolution (LTE) network such as evolved universal mobile telecommunication system (UMTS) terrestrial radio access network (E-UTRAN). The network 100 may include a base station, e.g., enhanced node base station (eNB) 104, configured to wirelessly communicate with user equipment (UE) 108.

At least initially, the eNB 104 may have an established wireless connection with the UE 108. The network 100 may further include one or more additional eNB's, such as eNB 112. The eNBs may each have generally the same transmission power capabilities as one another or, alternatively, some of the eNBs may have relatively lower transmission power capabilities. For example, in one embodiment the eNB 104 may be a relatively low-power base station such as a pico eNB, femto eNB, and/or Home eNB (HeNB) configured to communicate with the UE 108 within a first area 116, while the eNB 112 may be a relatively high-power base station such as a macro eNB configured to communicate within a second area 120 that is larger than the first area 116. In some embodiments, eNB 104 may be a closed subscriber group eNB.

Figure 2:
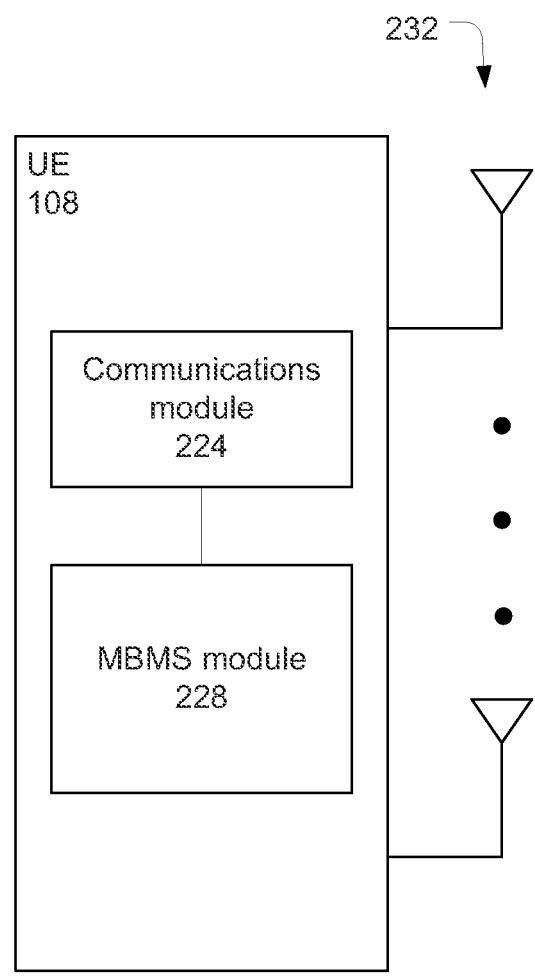
FIG. 2 is a block diagram illustrating a user equipment in accordance with various embodiments.

As shown in FIG. 2, the UE 108 may include a communications module 224 and an MBMS module 228. The communications module 224 may be further coupled with one or more of a plurality of antennas 232 of the UE 108 for communicating wirelessly over network 100.

The UE 108 may include any suitable number of antennas 232. In various embodiments, the UE 108 may include at least as many antennas 232 as a number of simultaneous spatial layers or streams received by the UE 108 from the eNBs 104 and/or 112, although the scope of the present disclosure may not be limited in this respect. The number of simultaneous spatial layers or streams may also be referred to as transmission rank, or simply rank.

One or more of the antennas 232 may be alternately used as transmit or receive antennas. Alternatively, or additionally, one or more of the antennas 232 may be dedicated receive antennas or dedicated transmit antennas.

Figure 3:
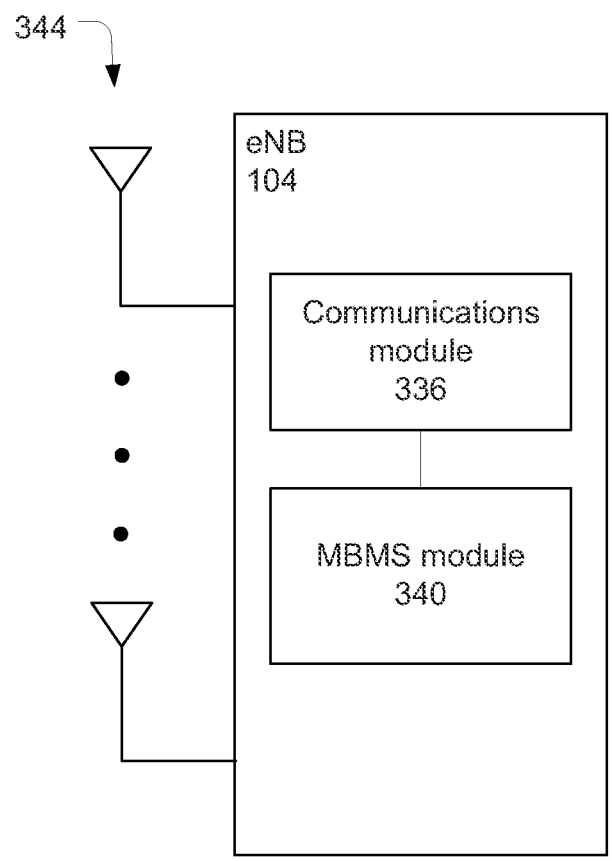
FIG. 3 is a block diagram illustrating a base station in accordance with various embodiments.

As shown in FIG. 3, eNB 104 may include a communications module 336 and an MBMS module 340 coupled with one another at least as shown. The communications module 336 may be further coupled with one or more of a plurality of antennas 344 of the eNB 104. The communications module 336 may communicate (e.g., transmit and/or receive) with one or more UEs (e.g., UE 108). In various embodiments, the eNB 104 may include at least as many antennas 344 as a number of simultaneous transmission streams transmitted to the UE 108, although the scope of the present disclosure may not be limited in this respect. One or more of the antennas 344 may be alternately used as transmit or receive antennas. Alternatively, or additionally, one or more of the antennas 344 may be dedicated receive antennas or dedicated transmit antennas. Alternatively, or additionally, one or more of the antennas 344 may alternate between communicating in one or more cells 116a-c.

In some embodiments, the eNB 112 may have similar modules/components as eNB 104.

In various embodiments, the MBMS module 340 of the eNB 104 may transmit, via the communications module 336, MBMS assistance information to the UE 108. In some embodiments, the MBMS assistance information may be included in a system information block (SIB) transmission. The MBMS assistance information may identify a carrier by which one or more upcoming MBMS services are to be provided. In some embodiments, the MBMS assistance information may include a frequency indicator to identify the carrier. The frequency indicator may be a numerical value of the frequency of the carrier and/or an index corresponding to the carrier.

The MBMS assistance information may further include in indicator of a carrier selection mode to be used by the UE 108. In some embodiments, the carrier selection mode may be a first selection mode that prioritizes selection of carriers that provide MBMS services or a second selection mode that prioritizes carriers based on signal quality (e.g., without regard to whether the carrier offers MBMS services). This carrier selection mode indicator may be used to manage loading of the carriers. With either selection mode, the UE 108 may receive the MBMS service on a "best effort" basis.

For example, if there is low congestion on the MBMS-bearing carrier, the carrier selection mode may be set to the first selection mode and the UE 108 may prioritize the MBMS-bearing carrier if the UE 108 wishes to receive MBMS services. The UE 108 may also receive unicast service on the MBMS-bearing carrier. If there is high congestion, the carrier selection mode may be set to the second selection mode so that the UE 108 will prioritize carriers based on signal quality without regard to whether the carrier transmits MBMS. In that case, the UE 108 may select an MBMS-bearing carrier or a non-MBMS carrier for unicast service, for example based on relative signal quality. The UE 108 may still receive the MBMS service based on a "best effort," for example, if the UE 108 selects the MBMS-bearing carrier for unicast service and/or the UE 108 has another receiver to receive MBMS service.

In some embodiments, the MBMS assistance information may further include a non-MBMS restriction indicator of whether the carrier is restricted for non-MBMS access. If the carrier is restricted for non-MBMS access, the UE 108 may receive the MBMS transmission on that carrier, but may not interact with the cell that transmits the MBMS (e.g., eNB 112) on that carrier. This may facilitate management of loading on the MBMS-bearing carriers and/or cooperation between the serving eNB (e.g., eNB 104) and the MBMS-transmitting eNB (e.g., eNB 112).

In some embodiments, the MBMS assistance information transmitted by eNB 104 may include information about MBMS services transmitted by another eNB (e.g., eNB 112). In one embodiment, the network 100 may include higher power eNBs (e.g., eNB 112 in FIG. 1) that transmit MBMS services (in addition to providing unicast services), and lower power eNBs (e.g., eNB 104 in FIG. 1) that provide unicast service but do not transmit MBMS services. The UE 108 may receive the MBMS assistance information from any of the eNBs of the network 100, whether or not the eNB provides the MBMS services. For example, the UE 108 may receive the MBMS assistance information from the serving eNB that is currently associated with the UE 108. This may facilitate service continuity for the UE 108.

In some embodiments, the MBMS assistance information may include information for multiple alternative MBMS-bearing carriers. The multiple alternative MBMS-bearing carriers may be transmitted by the same eNB or different eNBs.

In some embodiments, the eNB 104 may transmit MBMS assistance information for MBMS services transmitted by a different provider of wireless communications services than the provider associated with the eNB 104. For example, the eNB 104 may be associated with a first provider, and the eNB 112 may be associated with a second provider. The first provider may have an agreement with the second provider for the second provider to provide MBMS services for customers of the first provider. Accordingly, the eNB 104 may transmit MBMS assistance information for MBMS services transmitted by the second provider which are available to the UE 108.

In some embodiments, the MBMS assistance information transmitted to the UE 108 by the serving eNB 104 about MBMS services carried by another eNB (e.g., eNB 112) may also include information captured in SIB13, as defined by LTE Release 9 and LTE Release 10. In that case, the UE 108, using the information obtained from the serving eNB 104, may directly find the location of MCH on the host eNB 112 and process it without reading any system information from the host eNB 112.

In some embodiments, the MBMS related information may be broadcast by serving eNB 104 using as an extension of SIB13 by indicating relevance of included information to one or more alternative carriers.

In various embodiments, the UE 108 (e.g., the MBMS module 228 in conjunction with the communications module 224) may transmit an MBMS interest indication message to the eNB 104. In some embodiments, the MBMS interest indication message may be transmitted via radio resource control (RRC) signaling.

The MBMS interest indication message may include information related to one or more targeted MBMS services which the UE wants to receive. In some embodiments, the UE may receive an electronic service guide that includes information related to upcoming MBMS services offered in the network 100. The UE may select the one or more targeted MBMS services from the upcoming MBMS services included in the electronic service guide.

In some embodiments, the MBMS interest indication message may include a frequency of the individual targeted MBMS services. The MBMS interest indication message may include a frequency field that includes the frequency of the targeted MBMS services. In some embodiments, multiple MBMS services may be offered on the same carrier frequency. Alternatively, the frequency field may include a null value if there are no targeted MBMS services.

In various embodiments, the MBMS interest indication message may include information related to which subframes of the MBMS-bearing carrier are used to transmit the MBMS service. For example, the MBMS interest indication message may include one or more MBMS identifiers, such as a multicast-broadcast single frequency network (MBSFN) area identity, a temporary mobile group identity (TMGI), and/or a service identity of the targeted MBMS services. Alternatively, or additionally, the MBMS interest indication message may include multicast channel (MCH) information to identify subframes of the carrier frequency on which the targeted MBMS services are transmitted.

The eNB 104 may use the MBMS identifier and/or MCH information to determine which subframes of the carrier frequency are occupied by transmissions of the targeted MBMS services. The eNB 104 may make scheduling decisions and/or configure inter-frequency measurements based on the content of the MBMS interest indication message. For example, in some embodiments, the eNB 104 may schedule other transmissions and/or measurements (such as inter-frequency measurements) for the UE 108 on subframes of the carrier frequency that are not used for the targeted MBMS services.

In some embodiments, the UE 108 may use the same processor resources to process MBMS service and unicast service. The eNB 104 may take this into account when making scheduling decisions. For example, the MBMS interest indication message may indicate a percentage of the UE 108's processing power that is consumed/remains and/or expected to be consumed/remain due to the targeted MBMS services. Additionally, or alternatively, the UE 108 may indicate how many MBMS services the UE 108 is to receive concurrently (e.g., 1 or 2).

In some embodiments, the MBMS interest indication message may include a data processing headroom information element to indicate a level of data processing capacity of the UE 108. For example, the data processing headroom information element may include a Boolean value to indicate whether the UE 108 has reached a threshold data processing capacity or not (e.g., due to MCH reception). Alternatively, the data processing headroom information element may include multiple bits to indicate how much data processing capacity the UE 108 has left for unicast data.

The eNB 104 may use the data processing capacity information to avoid scheduling unicast data for the UE 108 concurrent with MBMS services that would exceed the total data processing power of the UE 108. In some embodiments, the total data processing power may be signaled separately to the eNB 104 as part of a UE category/capability.

In some embodiments, the MBMS interest indication message may include an MBMS-selection indicator to indicate whether the UE 108 is capable of receiving unicast service on the MBMS-bearing carrier frequency. The eNB 104 may use this indicator to make scheduling decisions for the UE 108.

In some embodiments, the MBMS interest indication may include a priority indicator to identify the UE 108's priority for receiving the targeted MBMS services compared with receiving unicast service. In some embodiments, the priority indicator may be set by a user of the UE 108.

In some embodiments, the priority indicator may be a single bit to indicate if MBMS service or unicast service is prioritized. In other embodiments, the priority indicator may include multiple bits to allow for multiple levels of priority. For example, a two-bit priority indicator may be used to indicate one of four levels of priority for the UE 108.

The four levels of priority may include a first level of priority in which the UE 108 is to receive MBMS service only and disconnect from all non-MBMS services. Accordingly, all non-MBMS services may be released by the network 100 and the UE 108 may be considered detached from the network 100. The UE 108 may perform a reconnection process to reconnect to the network 100 and resume unicast service.

In a second level of priority, MBMS may be given priority with unicast in idle. Under the second level of priority, all ongoing non-MBMS services may be released by the network 100, and the UE 108 goes into an idle mode. Paging messages may still be received by the UE 108 (e.g., for priority services).

In a third level of priority, MBMS may be given priority, but the UE 108 may maintain unicast services on a "best effort" basis. The network 100 may release all guaranteed bit rate (GBR) connections with the UE 108.

In a fourth level of priority, MBMS may be given low priority (e.g., unicast may be given priority over MBMS service). MBMS service may be accommodated only if there is no impact on unicast services, including GBR service.

In some embodiments, one priority indicator may be provided in the MBMS interest indication message that applies to all of the targeted MBMS services included in the message. In other embodiments, the MBMS interest indication message may include separate priority indicators for the individual targeted MBMS services.

In some embodiments, the MBMS interest indication may also indicate a relative priority among multiple targeted MBMS services. For example, the targeted services may be listed in the MBMS interest indication message in the order of their priority.

In various embodiments, the UE 108 may transmit the MBMS interest indication message to the eNB 104 only if one or more conditions are met. For example, the UE 108 may transmit the MBMS interest indication message if the targeted MBMS service is not offered on any of one or more serving cells that are currently serving the UE, all receivers of the UE are currently being used to receive transmissions from the serving cells, and unicast is permitted on the carrier frequency of the targeted MBMS service. The UE 108 may send another MBMS interest indication message if the identity and/or priority of the targeted MBMS services changes. Limiting the frequency of transmission of the MBMS interest indication message may reduce signal congestion.

Additionally, or alternatively, the UE 108 may send MBMS interest indication messages including the data processing headroom information element when changes occur to the remaining data processing capacity of the UE 108 (e.g., if the UE 108 stops receiving one or more MBMS transmissions). In some embodiments, the UE 108 may only update the eNB 104 about changes to the UE 108's data processing capacity if the change is above a threshold amount. Additionally, or alternatively, a threshold may be set below which changes to the processing capacity may not be indicated to the eNB 104.

In some embodiments, one or more of the parameters indicated by the MBMS interest indication message may be passed from a source eNB to a target eNB during handover of the UE 108 from the source eNB to the target eNB.

Figure 4:
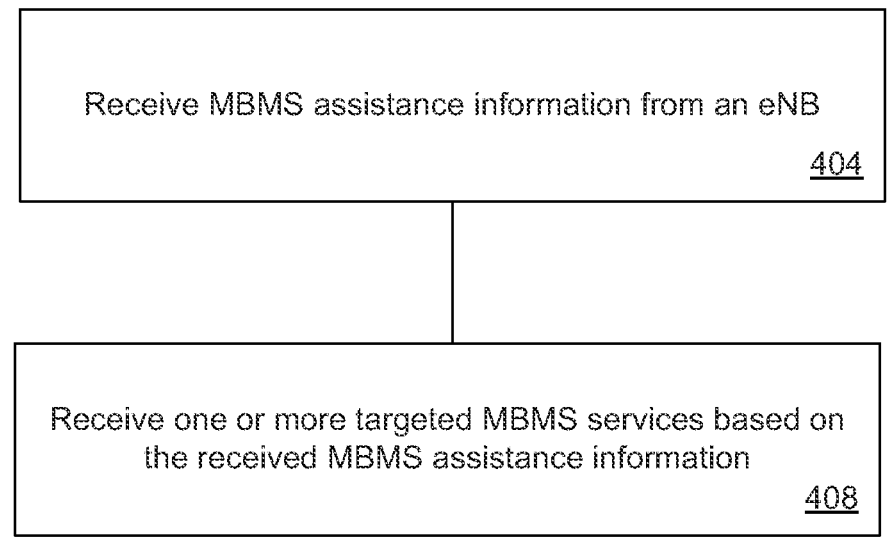
FIG. 4 is a flowchart illustrating a method for supporting multimedia broadcast multicast service (MBMS) that may be performed by a user equipment in accordance with various embodiments.

FIG. 4 illustrates a method 400 of supporting MBMS service in accordance with various embodiments. Method 400 may be performed by a UE, such as UE 108. In some embodiments, the UE may include and/or have access to one or more computer-readable media having instructions stored thereon, that, when executed, cause the UE to perform the method 400.

At 404, the UE may receive MBMS assistance information from an eNB (e.g., eNB 104). In some embodiments, the MBMS assistance information may be included in an SIB transmission. The MBMS assistance information may include a frequency of one or more MBMS carriers on which MBMS services are to be transmitted, an indicator of a carrier selection mode to be used by the UE, and an indicator of whether non-MBMS access to the MBMS carrier is permitted. The carrier selection mode may be a first selection mode that prioritizes selection of carriers that provide MBMS services or a second selection mode that prioritizes carriers based on signal quality.

In some embodiments, the MBMS carriers may be transmitted by a different eNB than the eNB from which the UE receives the MBMS assistance information. For example, the UE may receive the MBMS assistance information from a serving eNB. The serving eNB may or may not transmit MBMS carriers. In some embodiments, the serving eNB may be a relatively low power eNB (e.g., a pico eNB and/or an HeNB) and/or a closed subscriber group eNB.

At 408, the UE may receive one or more MBMS services based on the received MBMS assistance information. The UE may select one or more targeted MBMS services that the UE wishes to receive. For example, the targeted MBMS services may be selected by the user of the UE. The UE may then use the information included in the MBMS assistance information to receive the targeted MBMS services.

Figure 5:
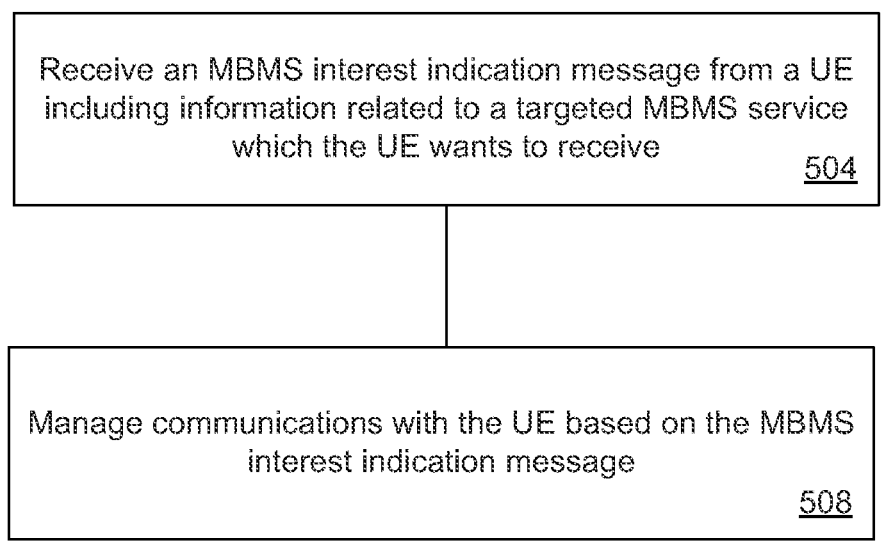
FIG. 5 is a flowchart illustrating a method for managing MBMS service that may be performed by a base station in accordance with various embodiments.

FIG. 5 illustrates a method 500 of managing MBMS service with a UE (e.g., UE 108) in accordance with various embodiments. Method 500 may be performed by an eNB, such as eNB 104. In some embodiments, the eNB may include and/or have access to one or more computer-readable media having instructions stored thereon, that, when executed, cause the eNB to perform the method 500.

At 504, the eNB may receive an MBMS interest indication message from a UE including information related to a targeted MBMS service which the UE wants to receive. For example, the MBMS interest indication message may include MCH information that identifies the resources (e.g., subframes) of the MBMS carrier that are used for the targeted MBMS service. The MBMS interest indication message may include a frequency field that identifies the frequency of the MBMS carrier on which the targeted MBMS service is to be transmitted. In some embodiments, the frequency field may include a null value to indicate that there are no targeted MBMS services for the UE or UE is no longer interested in any on going to upcoming MBMS service.

The MBMS interest indication message may include further information as discussed herein. For example, the MBMS interest indication message may include an MBSFN area identity, a TMGI, and/or a service identity of the targeted MBMS service. Additionally, or alternatively, the MBMS interest indication message may include a priority indicator to identify a priority of receiving the targeted MBMS service compared with receiving unicast service for the UE.

In some embodiments, the MBMS interest indication message may be sent if one or more conditions are met, as discussed herein. The MBMS interest indication message may be received via RRC signaling.

At 508, the eNB may manage communications with the UE based on the MBMS interest indication message. For example, the eNB may schedule transmissions and/or measurements for the UE on resources of the MBMS carrier on which the MCH for the targeted MBMS service is not transmitted.

Figure 6:
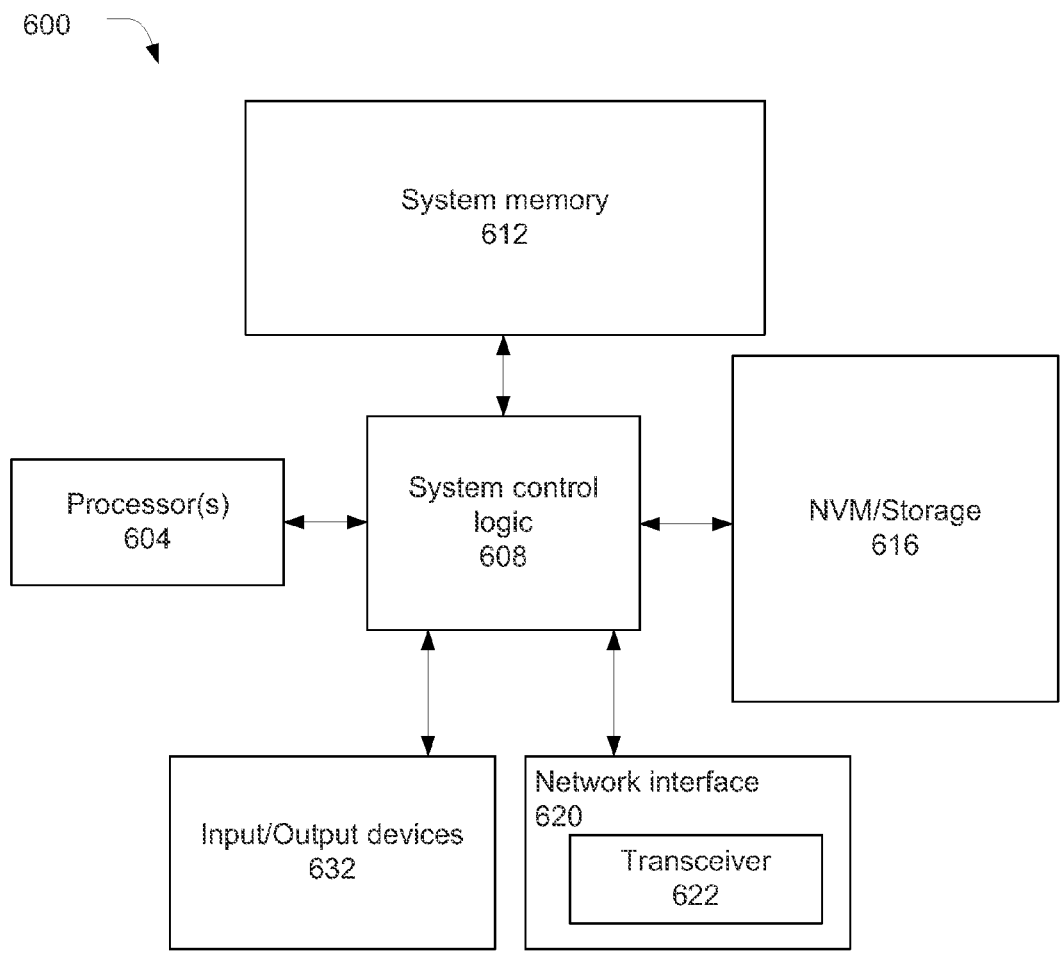
FIG. 6 schematically depicts an example system in accordance with various embodiments.

The eNB 104/112 and/or UE 108 described herein may be implemented into a system using any suitable hardware and/or software to configure as desired. FIG. 6 illustrates, for one embodiment, an example system 600 comprising one or more processor(s) 604, system control logic 608 coupled with at least one of the processor(s) 604, system memory 612 coupled with system control logic 608, non-volatile memory (NVM)/storage 616 coupled with system control logic 608, a network interface 620 coupled with system control logic 608, and input/output (I/O) devices 632 coupled with system control logic 608.

The processor(s) 604 may include one or more single-core or multi-core processors. The processor(s) 604 may include any combination of general-purpose processors and dedicated processors (e.g., graphics processors, application processors, baseband processors, etc.).

System control logic 608 for one embodiment may include any suitable interface controllers to provide for any suitable interface to at least one of the processor(s) 604 and/or to any suitable device or component in communication with system control logic 608.

System control logic 608 for one embodiment may include one or more memory controller(s) to provide an interface to system memory 612. System memory 612 may be used to load and store data and/or instructions, for example, for system 600. System memory 612 for one embodiment may include any suitable volatile memory, such as suitable dynamic random access memory (DRAM), for example.

NVM/storage 616 may include one or more tangible, non-transitory computer-readable media used to store data and/or instructions, for example. NVM/storage 616 may include any suitable non-volatile memory, such as flash memory, for example, and/or may include any suitable non-volatile storage device(s), such as one or more hard disk drive(s) (HDD(s)), one or more compact disk (CD) drive(s), and/or one or more digital versatile disk (DVD) drive(s), for example.

The NVM/storage 616 may include a storage resource physically part of a device on which the system 600 is installed or it may be accessible by, but not necessarily a part of, the device. For example, the NVM/storage 616 may be accessed over a network via the network interface 620 and/or over Input/Output (I/O) devices 632.

Network interface 620 may have a transceiver 622 to provide a radio interface for system 600 to communicate over one or more network(s) and/or with any other suitable device. The transceiver 622 may implement communications module 224. In various embodiments, the transceiver 622 may be integrated with other components of system 600. For example, the transceiver 622 may include a processor of the processor(s) 604, memory of the system memory 612, and NVM/Storage of NVM/Storage 616. Network interface 620 may include any suitable hardware and/or firmware. Network interface 620 may include a plurality of antennas to provide a multiple input, multiple output radio interface. Network interface 620 for one embodiment may include, for example, a wired network adapter, a wireless network adapter, a telephone modem, and/or a wireless modem.

For one embodiment, at least one of the processor(s) 604 may be packaged together with logic for one or more controller(s) of system control logic 608. For one embodiment, at least one of the processor(s) 604 may be packaged together with logic for one or more controllers of system control logic 608 to form a System in Package (SiP). For one embodiment, at least one of the processor(s) 604 may be integrated on the same die with logic for one or more controller(s) of system control logic 608. For one embodiment, at least one of the processor(s) 604 may be integrated on the same die with logic for one or more controller(s) of system control logic 608 to form a System on Chip (SoC).

In various embodiments, the I/O devices 632 may include user interfaces designed to enable user interaction with the system 600, peripheral component interfaces designed to enable peripheral component interaction with the system 600, and/or sensors designed to determine environmental conditions and/or location information related to the system 600.

In various embodiments, the user interfaces could include, but are not limited to, a display (e.g., a liquid crystal display, a touch screen display, etc.), a speaker, a microphone, one or more cameras (e.g., a still camera and/or a video camera), a flashlight (e.g., a light emitting diode flash), and a keyboard.

In various embodiments, the peripheral component interfaces may include, but are not limited to, a non-volatile memory port, a universal serial bus (USB) port, an audio jack, and a power supply interface.

In various embodiments, the sensors may include, but are not limited to, a gyro sensor, an accelerometer, a proximity sensor, an ambient light sensor, and a positioning unit. The positioning unit may also be part of, or interact with, the network interface 620 to communicate with components of a positioning network, e.g., a global positioning system (GPS) satellite.

In various embodiments, the system 600 may be a mobile computing device such as, but not limited to, a laptop computing device, a tablet computing device, a netbook, a smartphone, etc. In various embodiments, system 600 may have more or less components, and/or different architectures.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims and the equivalents thereof.

What is claimed is:

1. An apparatus to be employed by a user equipment (UE), the apparatus comprising:
   a communications module to communicate with an evolved NodeB (eNB) of an evolved universal terrestrial radio access network (E-UTRAN); and
   a multimedia broadcast multicast service (MBMS) module to:
   transmit an MBMS interest indication message, to the eNB via the communications module, to indicate an interest in an MBMS, the MBMS interest indication message including an MBMS frequency on which the UE is receiving or interested in receiving the MBMS; and
   transmit another MBMS interest indication message including a null frequency if the UE is no longer receiving or interested in receiving the MBMS.

2. The apparatus of claim 1, wherein the MBMS interest indication message includes a plurality of MBMS frequencies that are associated with respective MBMSs the UE is receiving or interested in receiving.

3. The apparatus of claim 1, wherein the MBMS interest indication message further includes an MBMS-selection indicator to indicate whether the UE is capable of receiving unicast service on the MBMS frequency.

4. The apparatus of claim 1, wherein the MBMS interest indication message includes a multicast-broadcast single frequency network (MBSFN) area identity, a temporary mobile group identity (TMGI), or a service identity of a targeted MBMS.

5. The apparatus of claim 1, wherein the MBMS interest indication message includes multicast channel (MCH) information to identify subframes of the MBMS frequency on which the MBMS the UE is receiving or interested in receiving is transmitted.

6. The apparatus of claim 1, wherein the MBMS interest indication message includes a data processing headroom information element to indicate a level of data processing capacity of the UE that is available for unicast data.

7. The apparatus of claim 1, wherein the MBMS interest indication message includes a priority indicator to identify a priority of receiving the MBMS on the MBMS frequency over receiving unicast service for the UE.

8. The apparatus of claim 7, wherein the priority indicator includes a single bit to indicate if the UE prioritizes reception of the MBMS over the unicast service.

9. The apparatus of claim 7, wherein the MBMS interest indication message includes a plurality of MBMS frequencies that are associated with respective MBMSs the UE is receiving or interested in receiving, and wherein the priority indicator applies to all MBMS frequencies included in the MBMS interest indication message.

10. The apparatus of claim 7, wherein the MBMS interest indication message includes a plurality of MBMS frequencies that are associated with respective MBMSs the UE is receiving or interested in receiving, and wherein the MBMS interest indication message includes priority indicators for individual MBMS frequencies of the plurality of MBMS frequencies.

11. The apparatus of claim 1, wherein the MBMS module is further to receive a system information block (SIB), from the eNB, including MBMS assistance information, wherein the MBMS module is to select the MBMS frequency included in the MBMS interest indication message based on the SIB.

12. The apparatus of claim 1, wherein the eNB is a source eNB, and wherein the source eNB is to transfer the MBMS indication message to a target eNB to facilitate handover of the UE from the source eNB to the target eNB.

13. The apparatus of claim 1, wherein the MBMS interest indication message is transmitted via radio resource control (RRC) signaling.

14. The apparatus of claim 1, further comprising a touch-screen display.

15. An apparatus to be employed by a user equipment (UE), the apparatus comprising:
   a communications module to communicate with an evolved NodeB (eNB) of an evolved universal terrestrial radio access network (E-UTRAN); and
   a multimedia broadcast multicast service (MBMS) module to:
   transmit an MBMS interest indication message, to the eNB via the communications module, to indicate an interest in an MBMS, the MBMS interest indication message including a MBMS frequency on which the UE is receiving or interested in receiving the MBMS and a priority indicator to identify a priority of receiving the MBMS on the MBMS frequency over receiving unicast service for the UE, wherein the priority indicator includes four bits to indicate one of four levels of priority.

16. An apparatus to be employed by a user equipment (UE), the apparatus comprising:
a communications module to communicate with an evolved NodeB (eNB) of an evolved universal terrestrial radio access network (E-UTRAN); and
a multimedia broadcast multicast service (MBMS) module to:
transmit an MBMS interest indication message, to the eNB via the communications module, to indicate an interest in an MBMS, the MBMS interest indication message including a MBMS frequency on which the UE is receiving or interested in receiving the MBMS, wherein the MBMS module is to transmit the MBMS interest indication message for the MBMS if:
the MBMS is not offered on any of one or more serving cells that are currently serving the UE;
all receivers of the UE are currently being used to receive transmissions from the serving cells; and
unicast access is permitted on the MBMS frequency of the MBMS.

17. An apparatus to be employed by a first evolved Node B (eNB), the apparatus comprising:
a communications module to communicate with a user equipment (UE) over an evolved universal terrestrial radio access network (E-UTRAN); and
a multimedia broadcast multicast service (MBMS) module to:
receive, from the UE via the communications module, a first MBMS interest indication message including an MBMS frequency on which the UE is receiving or interested in receiving an MBMS;
receive, from the UE via the communications module, a second MBMS interest indication message including a null frequency to indicate that the UE is no longer receiving or interested in receiving the MBMS; and
transfer the second MBMS interest indication message to a second eNB of the E-UTRAN in anticipation of a handover of the UE from the first eNB to the second eNB.

18. The apparatus of claim 17, wherein the communications module is configured to schedule communications with the UE based on the first or second MBMS interest indication message.

19. The apparatus of claim 17, wherein the first MBMS interest indication message further includes an MBMS-selection indicator to indicate if the UE can receive unicast service on the MBMS frequency.

20. The apparatus of claim 17, wherein the first MBMS interest indication message includes a multicast-broadcast single frequency network (MBSFN) area identity, a temporary mobile group identity (TMGI), or a service identity of a targeted MBMS.

21. The apparatus of claim 17, wherein the first MBMS interest indication message includes a priority indicator to identify a priority of receiving the MBMS compared with receiving unicast service for the UE.

22. The apparatus of claim 17, wherein the MBMS interest indication message is received for the MBMS if:
the MBMS is not offered on any of one or more serving cells that are currently serving the UE;
all receivers of the UE are currently being used to receive transmissions from the serving cells; and
unicast access is permitted on the MBMS frequency of the targeted MBMS.

23. The apparatus of claim 17, further comprising:
a plurality of antennas coupled to the communications module; and
a wired network adapter coupled to the communications module.

* * * * *